United States Patent
Woo et al.

(10) Patent No.: US 12,179,188 B2
(45) Date of Patent: Dec. 31, 2024

(54) ION-EXCHANGE MEMBRANES, FILTERS, AND METHODS

(71) Applicant: ENTEGRIS, INC., Billerica, MA (US)

(72) Inventors: Maybelle Woo, Dedham, MA (US); Jad A. Jaber, Westford, MA (US); Saksatha Ly, Lexington, MA (US); Jeffrey E. Townley, Townsend, MA (US); James Hamzik, North Billerica, MA (US); Justin Brewster, North Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 18/423,071

(22) Filed: Jan. 25, 2024

(65) Prior Publication Data
US 2024/0307864 A1 Sep. 19, 2024

Related U.S. Application Data (62) Division of application No. 17/350,970, filed on Jun. 17, 2021, now Pat. No. 11,918,990.

(60) Provisional application No. 63/040,150, filed on Jun. 17, 2020.

(51) Int. Cl.
| | |
|---|---|
| *B01J 47/014* | (2017.01) |
| *B01D 39/16* | (2006.01) |
| *B01D 67/00* | (2006.01) |
| *B01D 71/26* | (2006.01) |
| *B01J 47/12* | (2017.01) |

(Continued)

(52) U.S. Cl.
CPC ........ *B01J 47/014* (2017.01); *B01D 39/1692* (2013.01); *B01D 67/00931* (2022.08); *B01D 71/261* (2022.08); *B01D 71/262* (2022.08); *B01J 47/12* (2013.01); *C08F 255/02* (2013.01); *C08J 5/2243* (2013.01); *B01D 2201/184* (2013.01)

(58) Field of Classification Search
CPC ........ B01J 47/014; B01J 47/12; C08J 5/2243; B01D 39/1692; B01D 67/00931; B01D 37/262; B01D 37/261; C08F 255/02
USPC .......................................................... 521/27
See application file for complete search history.

(56) References Cited

U.S. PATENT DOCUMENTS

| | | |
|---|---|---|
| 5,434,270 A | 7/1995 | Ponticello et al. |
| 6,596,865 B1 | 7/2003 | Krummradt et al. |

(Continued)

FOREIGN PATENT DOCUMENTS

| | | |
|---|---|---|
| CA | 2758438 A1 | 10/2010 |
| CN | 1049296 A | 2/1991 |

(Continued)

OTHER PUBLICATIONS

Wang et al., Novel polymeric ionic liquid microspheres with high exchange capacity for fast extraction of plasmid DNA, Analytica Chimica Acta, vol. 837, pp. 64-69, 2014.

(Continued)

*Primary Examiner* — Michael M. Bernshteyn (57) ABSTRACT

Described are ion-exchange membranes that include a porous polymeric membrane and imidazole ion-exchange groups at surfaces of the membrane; ion-exchange membranes and filters that contain the ion-exchange membranes; and methods of using the ion-exchange membranes and filters for separating charged biological molecule from a liquid.

5 Claims, 3 Drawing Sheets

(51) Int. Cl.
*C08F 255/02* (2006.01)
*C08J 5/22* (2006.01)

(56) References Cited

U.S. PATENT DOCUMENTS

| | | | | |
|---|---|---|---|---|
| 8,415,277 B2* | 4/2013 | Hwang | ............... | C07D 213/40 |
| | | | | 424/1.53 |
| 9,802,979 B2 | 10/2017 | Bracewell et al. | | |
| 9,834,623 B1 | 12/2017 | Lee et al. | | |
| 2001/0014650 A1* | 8/2001 | Smith | ............... | C12N 15/101 |
| | | | | 502/407 |
| 2004/0203149 A1* | 10/2004 | Childs | ............... | C07K 1/04 |
| | | | | 435/404 |
| 2010/0063267 A1* | 3/2010 | Hwang | ............... | C07D 213/40 |
| | | | | 536/25.4 |
| 2014/0238935 A1* | 8/2014 | Komkova | ............ | B01D 15/363 |
| | | | | 502/402 |
| 2019/0249150 A1 | 8/2019 | Etzel | | |
| 2019/0282961 A1 | 9/2019 | Hamzik et al. | | |
| 2020/0171442 A1 | 6/2020 | Filipancic et al. | | |
| 2021/0170389 A1* | 6/2021 | Tomlinson | ............ | B01J 47/014 |

FOREIGN PATENT DOCUMENTS

| | | | |
|---|---|---|---|
| CN | 102049202 | A | 5/2011 |
| CN | 103357451 | A | 10/2013 |
| CN | 106110898 | A | 11/2016 |
| CN | 108409927 | A | 8/2018 |
| CN | 109964123 | A | 7/2019 |
| CN | 111094564 | A | 5/2020 |
| CN | 111266023 | A | 6/2020 |
| EP | 1345952 | B1 | 11/2004 |
| JP | 2010158624 | A | 7/2010 |
| PL | 1737945 | T3 | 7/2011 |
| TW | 201318705 | A | 5/2013 |
| TW | 201819511 | A | 6/2018 |
| WO | 199830571 | A1 | 7/1998 |
| WO | 2011081898 | A1 | 7/2011 |

OTHER PUBLICATIONS

Satoshi, Development of high performance protein separation membranes using grafted polymer chains with ion-exchange groups, The University of Tokyo Doctorial Dissertation, pp. 1-29, 1994.

* cited by examiner

ION-EXCHANGE MEMBRANES, FILTERS, AND METHODS

CROSS-REFERENCE TO RELATED APPLICATIONS

This application is a divisional of U.S. patent application Ser. No. 17/350,970 filed Jun. 17, 2021, now U.S. Pat. No. 11,918,990, which claims the benefit under 35 USC 119 of U.S. Provisional Patent Application No. 63/040,150 filed Jun. 17, 2020, the disclosures of which are hereby incorporated herein by reference in their entirety.

FIELD OF THE INVENTION

The following description relates to ion-exchange membranes that include a porous polymeric base, and imidazole ion-exchange groups attached to the porous polymeric base; to ion-exchange membranes and filters that contain the ion-exchange membranes; and to methods of using the ion-exchange membranes and filters for separating charged biological molecules such as (but not limited to) plasmid DNA from a liquid.

BACKGROUND

Purification of charged biological molecules such as DNA, e.g., plasmid DNA ("pDNA") is typically carried out by ion-exchange chromatography. However, chromatography resins can exhibit poor accessibility, slow mass transport, and low binding capacities. Moreover, it is labor- and time-intensive to pack, clean, and validate chromatography columns.

SUMMARY

The following description involves ion-exchange membranes and related method that address the limitations of previous purification methods that involve chromatography resins, by providing a single-use (disposable), highly convective ion-exchange membrane with pores that are large enough for adsorbing charged biological molecules such as DNA (e.g., plasmid DNA), proteins, nucleic acids, endotoxins, viruses, and the like. The porous membranes have high surface areas for good accessibility of the molecules to the membrane, and high binding capacities.

The present description relates to improved ion-exchange membranes and related methods, wherein the membranes are effective to selectively adsorb and subsequently release (desorb), e.g., based on pH, charged biological molecules. The membranes include ion-exchange groups in the form of charged imidazole groups located at surfaces of a porous polymeric membrane. The ion-exchange membranes are in the form of "sheets" or "films" that can be used and re-used, or that may be disposable. A disposable design results in faster setup time, flexible processing, and easy handling. Optimized membrane morphology, including surface area and pore size, enables more efficient separation and collection of biological molecules (e.g., plasmid DNA) from a liquid medium due to enhanced exposure to available surface area and a greater binding capacities for a charged biological compound as a target molecule. Conventional chromatography resin bed techniques do not achieve efficiencies of methods that are described herein.

As used herein, the term "target" molecule, or the like, refers to a molecule of a liquid that is desirably separated from other molecules in the liquid. A biological fluid may contain multiple different charged biological molecules, including plasmid DNA, RNA, lipopolysaccharides, proteins, and genomic DNA. In a separation process or a purification process, any one of these may be a target molecule, and all other charged molecules are considered to be non-target molecules, or "impurities." A particular charged biological molecule contained in a biological fluid (or other liquid) may be selected as a target molecule, over other charged biological molecules in the fluid, based on various factors, such as a high commercial importance or value of the selected (target) charged biological molecule. In various examples, plasmid DNA may be selected as a target molecule in a biological fluid, relative to non-target molecules that may include RNA, lipopolysaccharides, proteins, and genomic DNA. According to other example methods of this description, a different charged biological molecule may be selected as a target molecule, such as an RNA molecule, a lipopolysaccharide, a protein, or genomic DNA.

Also according to methods as described, a charged biological molecule that is selected for adsorbing onto a membrane may be a target molecule or may be a non-target molecule. A membrane as described may be used to selectively adsorb one or multiple charged biological molecules contained in a liquid, from among a mixture of multiple charged biological molecules present in the liquid, the mixture including both target molecules and non-target molecules As a particular example, a membrane can be used to selectively bind (selectively adsorb) plasmid DNA contained in a biological liquid that contains plasmid DNA within a mixture of various charged biological molecules (e.g., "impurities" such as RNA, lipopolysaccharides, and genomic DNA) without adsorbing the impurities. The impurities pass through the membrane while the plasmid DNA adsorbs onto the membrane and can be subsequently desorbed (eluted) and collected. According to other examples, a membrane can be used to selectively bind (selectively adsorb) charged biological molecules other than plasmid DNA (e.g., to bind "impurities" such as RNA, lipopolysaccharides, proteins, and genomic DNA), without binding (adsorbing) plasmid DNA. The plasmid DNA passes through the membrane and can be collected.

The surface of the porous membrane includes charged imidazole ion-exchange groups that are effective for selectively adsorbing and releasing charged biological molecules. According to a single particular example, the exemplified membranes of this disclosure can be effective for the selective binding of plasmid DNA over "impurities" such as RNA, lipopolysaccharides, proteins, and genomic DNA, in a biological liquid. Imidazole is a unique functional group with a pKa of approximately 5.2. Membranes as described have imidazole groups that exhibit pH-dependent and transient surface charge density, e.g., a positive charge at a pH in a range below 5.2 and a neutral charge at a pH in a range above 5.2. The transient surface charge density of imidazole functional groups permits the desired separation of biological molecules from a liquid medium and the subsequent release and collection of the molecules upon the introduction of a varying pH condition. Under acidic conditions, the membrane surface is predominantly positively charged and can bind charged biological molecules such as plasmid DNA molecules through electrostatic interactions. At basic conditions, the imidazole group deprotonates and eliminates the electrostatic complex of the charged biological molecule (e.g., plasmid DNA molecule) with the imidazole group, resulting in a selective release of the charged biological molecule (e.g., plasmid DNA molecule) at significantly lower ionic strength compared to a chromatography resin bed.

In one aspect, the invention relates to a method of separating a charged biological molecule from a liquid using a porous ion-exchange membrane sheet that contains imidazole ion-exchange groups. The method includes contacting a liquid that contains the charged biological molecule with a porous ion-exchange membrane that includes a porous polymeric sheet and imidazole ion-exchange groups at surfaces of the porous polymeric sheet, at an adsorption condition that causes the charged biological molecule to adsorb onto the ion-exchange membrane. The subsequent introduction of the membrane to an elevated pH value releases the charged biological molecule, allowing for the charged biological molecules to be collected in a concentrated form. Additionally, the physical characteristics of the membrane may impact the contact and exposure of the biological molecule to the charged imidazole ion-exchange groups and enhance the attraction of the molecules to the membrane.

In another aspect, the invention relates to a porous ion-exchange membrane comprising imidazole ion-exchange groups at surfaces of the membrane, wherein charges of the imidazole ion-exchange groups are pH-dependent and exhibit a positive charge at a pH in a range below 5.2 and a neutral charge at a pH in a range above 5.2.

In yet another aspect, the invention relates to a method of preparing a porous ion-exchange membrane that contains imidazole ion-exchange groups grafted to surfaces of a polymeric porous membrane base. The method includes chemically bonding imidazole ion-exchange groups to a surface of a porous polymeric membrane.

In yet another aspect, the invention relates to a method of preparing a porous ion-exchange membrane that contains a polymeric porous membrane base and a crosslinked polymer network that contains imidazole ion-exchange groups at a surface of the base. The method includes placing a coating composition at a surface of the base, the coating composition comprising vinylimidazole and crosslinker, and reacting the vinylimidazole and crosslinker to form the crosslinked polymer network on the surface.

DESCRIPTION

The following description relates to porous ion-exchange membranes; products that contain an ion-exchange membrane; and methods of using ion-exchange membranes, such as for separating a charged biological molecule such as DNA, e.g., plasmid DNA, from a liquid that contains the charged biological molecule.

The porous ion-exchange membrane contains a porous polymeric membrane that includes imidazole ion-exchange groups attached at surfaces of the porous polymeric membrane. The imidazole ion exchange groups can be charged, based on pH, for the selective binding and de-binding ("eluting") of charged biological molecules. Imidazole ion exchange groups are uniquely effective for purifying charged biological molecules such as plasmid DNA, due to a pKa of approximately 5.2. Imidazole ion exchange groups provide a pH-dependent and transient surface charge density. Under acidic conditions, the imidazole groups exhibit a predominantly positively charge and can bind a charged biological group such as plasmid DNA through electrostatic interactions. On the other hand, the imidazole groups deprotonate under basic conditions bringing about the destruction of the electrostatic complex and subsequent release of the charged biological molecule (e.g., plasmid DNA) with better yield and at significantly lower ionic strength compared to a chromatography resin bed.

The porous polymeric membrane is preferably in the form of a "sheet" or a "film" that includes two opposed major surfaces and a thickness between the two surfaces. The sheet, when lying flat, is substantially planar and has a substantially uniform thickness. A planar sheet membrane can be considered to extend in a length and a width dimension to define two opposed major surfaces, which are separated by the thickness in a third dimension. The sheet may preferably have a relatively uniform thickness over the length and width dimensions. A "membrane" as described is not in the form of particulates, such as a collection of porous polymeric resin particle, which are a different form of ion exchange media. A "membrane" as described is also different from a "monolith" chromatography device, which is a different form of a porous chromatography medium having a substantially greater thickness dimension compared to a "membrane."

The membrane is made of a polymeric porous membrane base that possesses physical characteristics that impact the separation and collection of the charged biological molecule from a liquid, and may enhance the exposure time and contact of the biological molecule to the imidazole ion-exchange groups. The porous polymeric membrane base may be selected to provide desired physical features that include porosity, pore size, and thickness.

One property of a useful membrane as described is charge density, which can be measured by techniques of dye-binding capacity, with various such techniques being known for measuring an amount of a particular functional group (by mass, e.g., in grams) per unit area of a membrane, e.g., as a measure of micrograms per square centimeter. Measurement techniques generally are performed by exposing a membrane to a dye solution that contains a known amount of dye that is attracted to ion exchange groups at a surface of a membrane. The negatively charged dye binds to the positively charged ion exchange groups. The absorbance of the dye solution to a relevant ultraviolet wavelength is measured before and after the dye has been bound to the ion exchange groups. The difference in absorbance of the dye solution before and after exposure to the membrane can be associated with the amount of ion exchange groups at the membrane surface. According to useful or preferred membranes, a charge density of a membrane, as measured by a dye-binding technique, may be in a range up to 300 micrograms per square centimeter, e.g., from 10 to 90 micrograms per square centimeter, or from 20 to 70 micrograms per square centimeter.

The membrane can have any thickness that allows the membrane to perform according to a method of the present description. Useful or preferred thicknesses can be in a range from 5 to 300 microns, e.g., from 10 or 20 to 50, 100, or 200 microns.

The porous membrane may have any porosity that will allow the membrane to be effective as described herein, for separating (selectively adsorbing and releasing) a charged biological molecule such as DNA, e.g., plasmid DNA, from a liquid that contains the charged biological molecule. Example porous membranes can have a porosity over a range of from 20 to 95 percent, e.g., a porosity in a range from 60 to 90 percent (volume). As used herein, and in the art of porous membranes, a "porosity" of a porous membrane (also sometimes referred to as void fraction) is a measure of the void (i.e. "empty") space in the membrane as a percent of the total volume of the membrane, and is calculated as a fraction of the volume of voids of the membrane over the total volume of the membrane. A body that has zero percent porosity is completely solid.

Examples of useful porous membranes may have pores of a size (average pore size) to be considered either a microporous membrane or macroporous membrane. Example pore sizes (average pore sizes) can be in a range of from 0.2 to 10 microns. Pore size is often reported as average pore size of a porous material, which can be measured by known techniques such as by Mercury Porosimetry (MP), Scanning Electron Microscopy (SEM), Liquid-Liquid Displacement Porometry (LLDP), or Air-Liquid Displacement Porometry (ALDP).

The membrane may have an open pore cellular structure, filamentary, non-woven (e.g., an electrospun nanofiber membrane), or another effective porous structure.

The polymer of the porous polymeric membrane base may be any that is capable of having imidazole ion-exchange groups chemically bonded to a surface of the membrane. A variety of different polymers (i.e., "base polymers") are available to form a porous polymeric filter membrane, with certain examples including non-fluorinated polymers such as polyolefins (e.g., polypropylene, polyethylene, polyhaloolefins), polyesters, polyimides, polyetherimides, polysulfones, polyethersulfones, polycarbonates, as well as fluoropolymers, and other general and specific types of useful polymers.

Suitable polyolefins include, for example, polyethylene (e.g., ultra-high molecular weight polyethylene (UPE)), polypropylene, alpha-polyolefins, poly-3-methyl-1-butene, poly-4-methyl-1-butene, and copolymers of ethylene, propylene, 3-methyl-1-butene, or 4-methyl-1-butene with each other or with minor amounts of other olefins; example polyhaloolefins include polytetrafluoroethylene, polyvinylidene fluoride, and co-polymer of these and other fluorinated or non-fluorinated monomers. Example polyesters include polyethylene terephthalate and polybutylene terephthalate, as well as related co-polymers.

The imidazole ion-exchange groups can be present at surfaces of the porous polymeric membrane in any effective form, and may be placed at the surface by any effective method, such as by a grafting technique by which imidazole ion-exchange groups are chemically bonded to a base polymer of a porous membrane, or by a technique of forming a crosslinked polymer network that contains imidazole ion-exchange groups at a surface of a porous membrane.

According to grafting techniques, imidazole groups can be attached chemically (i.e., grafted, covalently chemically bonded) to a carbon atom of a polymeric chain of a polymer material that forms a porous membrane, i.e., to base polymer that makes up the membrane. If the membrane is made of polyolefin (e.g., polyethylene), for example, the imidazole ion-exchange groups are chemically bonded to a carbon atom of the linear carbon backbone of the polyolefin (e.g., polyethylene). The imidazole groups can be attached to a carbon atom of base polymer of the membrane by a chemical reaction that involves UV-initiated reaction of vinylimidazole monomers with the base polymer, and polymerization of vinylimidazole monomers, optionally in the presence of one or more co-monomers, to chemically attach the vinylimidazole monomers to the polymer material of the membrane, e.g., at a polymeric backbone. The vinylimidazole monomers and optional co-monomer will form a sidechain attached to a carbon atom of the base polymer. The sidechain will include a divalent connecting group between the carbon of the polymeric backbone and a first imidazole group of the sidechain. A preferred divalent connecting group can be one that results in stability of the imidazole at a caustic condition, for example a divalent alkylene group such as a divalent methylene group, i.e., —CH$_2$—.

A length of the side-chain (i.e., the number of vinylimidazole monomers and optional co-monomers of the sidechain) may be any useful length, such as from 5 to 1000 monomers, or from 10 to 100 or 500 monomers.

An example of a side-chain and attachments to the backbone can have a structure of Formula 1:

Formula I

As illustrated, the sidechain of Formula 1 is derived from only vinylimidazole monomers. In other example, the sidechain can be derived from vinylimidazole and one or more comonomers, which will become part of the sidechain between vinylimidazole monomer. Examples of suitable comonomers include N-[2-(dimethylamino)ethyl]acrylamide and N-[2-(diethylamino)ethyl]acrylamide.

According to techniques of forming a crosslinked polymer network coating at a surface of a porous membrane, a polymeric network is formed from monomers that include vinylimidazole and crosslinker, e.g., a di-functional crosslinking molecule such as a di-functional acrylate compound (e.g., methylene-bisacrylamide (MBAM)), which are reacted to form a polymerized, crosslinked coating in the presence of UV radiation and a UV initiator.

The crosslinked polymer network coating, which contains imidazole groups, is formed over surfaces of the membrane, without the coating or the imidazole groups becoming chemically bonded to polymer of the membrane. However, the linkage between imidazole groups and polymer of the crosslinked polymer network to which the imidazole groups are chemically attached is a direct bond between the imidazole group and a carbon atom of the polymer network. A structure of the imidazole-containing crosslinked polymer network is shown as Formula 2:

Formula 2

Formula 3

Formula 2 shows only the polymer of the crosslinked polymer network coating. Not illustrated is the base polymer of the porous membrane upon which the illustrated crosslinked polymer network is coated.

The imidazole ion-exchange groups of the grafted polymer structure of Formula 1, and of the polymeric crosslinked network coating of Formula 2, both exhibit useful or advantageous effectiveness and stability when used as part of a porous ion-exchange membrane as described, according to methods as described. These polymeric structures can produce a useful or advantageous level of charge density on a membrane surface.

Additionally, and advantageously, the imidazole ion-exchange groups of Formula 1 and Formula 2, can exhibit relatively good stability during adsorption and desorption cycles of charged molecules over multiple use cycles, including caustic cleaning cycles. The imidazole ion-exchange groups of Formula 1 and Formula 2 can exhibit relatively high chemical stability during any process step performed at an alkaline (caustic, basic) pH. The attachments of the imidazole groups to polymer (of a base polymer at Formula 1, or of a crosslinked polymer network coating as at Formula 2) are substantially stable when exposed to basic conditions.

A basic condition may be used during processing of a membrane for cleaning, such as to remove charged molecules from a surface of the membrane so that the membrane can be used again to adsorb charged molecules. This type of a "cleaning" step performed to allow a membrane to be re-used is sometimes performed by washing the membrane with a sodium hydroxide solution or another basic (caustic) solution. When the membrane is cleaned in this fashion, the imidazole ion-exchange groups, which is attached by a direct bond between a carbon atom of the polymer and a nitrogen atom of the imidazole group or alternately through an alkylene group such as a methylene group as described, are substantially stable with respect to remaining at the surface of the membrane. For comparison, imidazole ion-exchange groups that are attached through a different divalent connecting group, e.g., a connecting ester (R—O—C(O)-(imidazole nitrogen)) (see Formula 3, below) may be much more easily removed when exposed to a basic condition, i.e., are much less "caustic stable."

Formula 3, containing an ester (—O—C(O)—) linkage between a polymer (designated as R) and an imidazole group, is less stable to caustic conditions, such as those experienced in a caustic cleaning step:

The membrane can be useful for selectively adsorbing and optionally selectively desorbing ("eluting") one or a combination of a target charged biological molecule, a non-target charged biological molecule, or a combination of target and non-target charged biological molecules to remove the target or the non-target molecules from a liquid that contains a combination of the charged target molecule along with other non-target molecules (e.g., "impurities"). After being adsorbed, charged target or non-target molecules can be desorbed. If a combination of both target and non-target molecules are adsorbed, either target or non-target molecules can be selectively desorbed.

According to one specific method, a membrane can be used to first selectively adsorb a desired target molecule, without adsorbing non-target molecules. The adsorbed target molecule can then be eluted and collected in a concentrated form without the impurities found in the initial liquid.

By an alternative method, a membrane can be used to selectively adsorb one or a combination of charged biological molecules that are non-target molecules, without adsorbing desired target molecules. The adsorbed non-target charged biological molecules remain on the membrane surface, while the desired target molecules flow through the membrane and can be collected and recovered separately from the adsorbed non-target molecules. The membrane, by this method, selectively removes only non-target molecules, while target molecules pass through the membrane.

By yet another method, a membrane can be used to adsorb a combination of both target and non-target molecules, followed by selective desorption of either target or non-target molecules, with a result being separation of target molecules from non-target molecules. After adsorption, selective desorption can be used to desorb either target or non-target molecules.

Desorption of selected molecules from a membrane can be achieved by selecting features of a desorption solution, such as chemical or physical features that include: composition (e.g., by adding a surfactant or an ionic compound), salinity, pH, or conductivity, among others, of the desorption solution. Desorption can also be controlled by residence time of a desorption solution, which can be adjusted for different size biological compounds (e.g., RNA versus DNA). The membrane, by this method, selectively allows for specific desorption of only target molecules or only non-target molecules, to separate the target molecules from the non-target molecules. If only non-target molecules are desorbed, the target molecules remain on the membrane and can be subsequently desorbed in a separate desorption step, after a step of desorbing the non-target molecules.

According to described methods, an amount of a desired target molecule that can be recovered can be any amount that will be useful. A useful amount can depend on the type of the target molecule, particularly the value of the target molecule. Useful amounts of recovered target molecule can be measured as an amount (in percent) of target molecule that is adsorbed on a membrane, that is collected by being desorbed; a percent of recovered target molecule is an amount of target molecule adsorbed on a membrane, that is then desorbed, relative to the total amount of the target molecule that was originally adsorbed on the membrane before desorption. Examples of useful amounts of recovered target molecule that may be achieved by a method as described, on that basis, may be at least 10, 40, 50, 70, or even 80 or 90 percent desorption of a total amount of target molecules originally adsorbed a membrane.

The liquid that contains the charged biological compounds (e.g., target molecules and non-target molecules) may be a liquid derived from any source and contains at least one desired target biological molecule. Example liquids may be derived from bacterial cells that contain the biological molecule, for example by alkaline lysis of bacterial cells. An alkaline lysis method may provide a biological liquid that contains an amount of the target molecule as well as impurities such as RNA and bacterial endotoxins. A method as described herein is capable of selectively adsorbing the target biological compound, which may often be plasmid DNA, without adsorbing non-target molecules such as the RNA and endotoxins. The adsorbed target molecule can then be eluted in a purified and concentrated form. Alternately, a method may adsorb non-plasmid DNA (or other non-target) molecules without adsorbing plasmid DNA. The non-adsorbed plasmid DNA or other target molecule passes through the membrane without being adsorbed and can be collected. As another option, the method may adsorb a combination of charged molecules, including target molecules, and a desorption step can selectively desorb either the target or the non-target molecules to separate the target molecules from the non-target molecules, as described herein.

In useful or preferred methods, a biological liquid that contains the target molecule and non-target impurities is contacted with an ion-exchange membrane as described at an adsorption condition, such as at an acidic condition. The adsorption condition may be a pH that is below about 6, e.g., in a range from about 4.5 to about 5.5. The adsorption condition causes charged biological molecules to be adsorbed onto the membrane surface, at the ion-exchange groups. As desired, target molecules, non-target molecules, or both are adsorbed onto the ion-exchange membrane by being electrostatically attracted to the imidazole ion-exchange groups.

Subsequent to the adsorption, the membrane is removed from the remaining biological liquid and, particularly if the membrane contains adsorbed target molecules, is exposed to an eluting condition that disrupts the electrostatic attraction between the target molecule and the imidazole ion-exchange groups, to release the adsorbed charged biological molecules. A useful or preferred eluting condition may be achieved by contacting the membrane, while the membrane contains adsorbed charged molecules at its surface, with a desorption solution that has a pH that is above about 7, e.g., a pH in a range from about 7.5 to about 9.5.

Optionally, to achieve selective desorption of either target or non-target molecules, a desorption step can be controlled by selecting features of a desorption solution such as chemical or physical features that include: composition (e.g., by adding a surfactant or an ionic compound), salinity, pH, conductivity, among others. Selective desorption can also be achieved by selecting a residence time of a desorption solution, which can be adjusted for different size biological compounds.

Certain previous techniques for eluting adsorbed molecules from an ionic membrane may also include or require a step of exposing the membrane, when the membrane contains adsorbed charged molecules, to an desorption solution that contains salt or a mixture of salts to thereby desorb the adsorbed charged molecules. With the presence of the salt, the desorption solution exhibits an increased conductivity. Examples of such desorption solutions may contain a 50 mM Tris and 1.5 M sodium chloride, or another salt or mixture of salts, to cause the elution solution to have a conductivity in a range of from 40 to 120 milliSiemens per centimeter.

While methods of the present description allow for and may benefit from a step of contacting the membrane (which contains adsorbed charged molecules) with a desorption solution that contains a salt and has a conductivity in this range, a step of contacting a membrane as described with a desorption solution that contains a salt, and has an increased conductivity due to the presence of the salt, is not required in example methods as described. According to certain example methods of the present description, a step of contacting the membrane, when the membrane contains adsorbed charged molecules, with a desorption solution that contains a salt to effect elution is not required and can be specifically avoided or excluded.

An optional step of contacting a membrane with a desorption solution that contains a salt and has a conductivity that facilitates elution, is typically an added step that is separate from and in addition to an elution step that contacts the membrane with a low pH solution. The added step of desorption with a salt, if avoided, will advantageously reduce overall complexity and cost of a process of separating a desired target molecule from a liquid.

The porous membrane can be contained within a filter body such as a filter or a filter cartridge that is used in a filtering system that contains a membrane as described, that is effective to adsorb and desorb (elute) a target molecule from a biological liquid. The filtering system will place the membrane, e.g., as part of a filter body or filter cartridge, in a flow path of a liquid, at an adsorption condition, to cause the liquid to flow through the membrane to cause charged biological molecules in the liquid to adsorb onto the membrane. The structure of a filter body or filter cartridge may include one or more of various additional materials and structures that support the membrane within the filter to cause fluid to flow from a filter inlet, through the membrane, and thorough a filter outlet, thereby passing through the membrane when passing through the filter body. The membrane supported by the filter body can be in any useful shape, e.g., a pleated cylinder, cylindrical pads, multiple "stacked" membranes, or more non-pleated (flat) cylindrical sheets, a pleated sheet, among others.

Figure 1A:
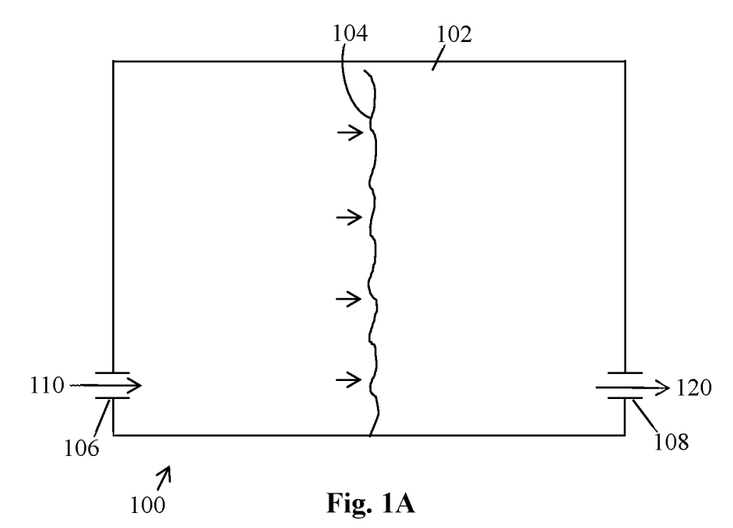
FIGS. 1A and 1B show an example filter product and method as described.
Figure 1B:
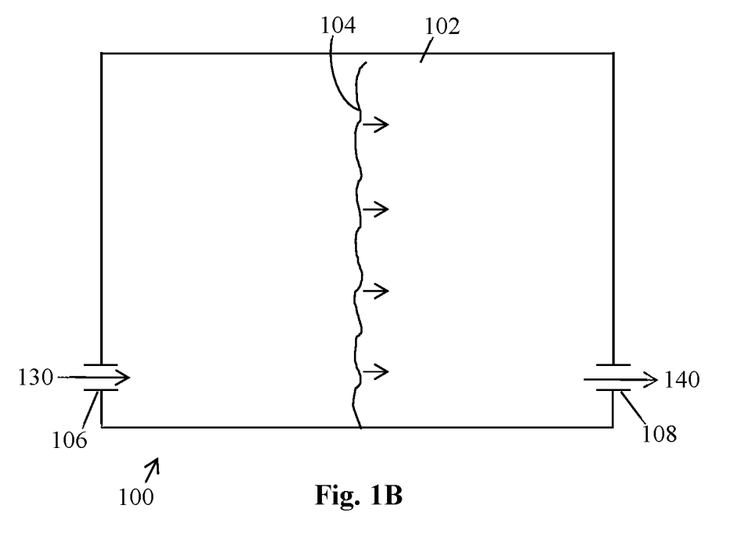

One example of a membrane contained in a filter body is shown at FIGS. 1A and 1B. As shown, filter 100 includes body 102, which defines inlet 106, outlet 108, and an interior that contains membrane 104. Liquid that passes through inlet 106 must pass through membrane 104 before exiting outlet 108.

In use, a biological liquid 110 that contains a target molecule and impurities is passed into inlet 106 at an adsorption condition, such as an acidic pH. As liquid 110 passes through membrane 104, target molecules contained in the biological liquid are adsorbed onto surfaces of membrane 114, at imidazole ion-exchange groups. Non-target molecules in liquid 110 are not adsorbed. Biological liquid 120, containing a reduced amount of the target molecules, exits body 102 by passing through outlet 108. Liquid 110 is passed through filter 100 in an amount to cause a desired amount of the target molecule to become adsorbed onto membrane 104.

In a subsequent step, as shown at FIG. 1B, the adsorbed target molecules are eluted from membrane 104 by passing a desorption solution 130 into inlet 106 and causing the desorption solution to pass through membrane 104. The desorption solution 130 has a pH that is sufficiently high to release the adsorbed target molecule from membrane 104. The desorption solution 140, containing an amount of the purified target molecule, exits body 100 at outlet 108.

By an alternative method of FIGS. 1A and 1B, liquid 110 that contains a target molecule and impurities (non-target molecules) is passed into inlet 106 at an adsorption condition, such as an acidic pH. As liquid 110 passes through membrane 104, non-target molecules contained in the biological liquid are adsorbed onto surfaces of membrane 114, at imidazole ion-exchange groups. Target molecules in liquid 110 are not adsorbed. Biological liquid 120, containing a reduced amount of the non-target molecules, exits body 102 by passing through outlet 108. Target molecules contained in biological liquid 120 can be collected by a useful method.

According to a different method, liquid 110, which contains a target molecule and non-target molecules, is passed into inlet 106 at an adsorption condition, such as an acidic pH. As liquid 110 passes through membrane 104, target molecules and non-target molecules contained in the liquid are adsorbed onto surfaces of membrane 114 at imidazole ion-exchange groups. Biological liquid 120, which contains a reduced amount of the target molecules and a reduced amount of non-target molecules, exits body 102 by passing through outlet 108.

In a subsequent step, as shown at FIG. 1B, either adsorbed target molecules or adsorbed non-target molecules are selectively eluted from membrane 104 by passing a desorption solution 130 into inlet 106 and causing the desorption solution to pass through membrane 104. The desorption solution 130 has a pH and other properties that may include a desired composition (e.g., the presence of a surfactant or ionic compound), salinity, pH, conductivity, etc., and is contacted with membrane 104 for a desired amount of time, to cause selective desorption of either target or non-target molecules from the surface of membrane 104.

The features and advantages of the methods and membranes of the present disclosure are more fully illustrated by the following non-limiting examples.

EXAMPLES

Example 1: This example demonstrates the preparation of surface modification with a solution that contains monomer and crosslinker to form a coating.

In a representative experiment, a solution was made at room temperature containing: 0.2% Irgacure 2959, 5% methanol, 3% vinylimidazole, 1% methylene bisacrylamide (MBAM) crosslinker, and 90.8% water.

Example 2: This example demonstrates the preparation of an initiator solution for use in a grafting step.

To form a representative initiator solution, 0.2 grams of benzophenone (99%, Sigma-Aldrich) were dissolved in 39.8 grams of isopropyl alcohol (IPA) to obtain 0.5 wt % benzophenone solution.

Example 3: This example demonstrates the preparation of monomer solutions (A) and (B) for grafting.

In a representative experiment, solution (A) was made at room temperature containing 5% vinylimidazole and 95% water.

In a representative experiment, solution (B) was made at room temperature containing 4% vinylimidazole, 1% dimethylacrylamide and 95% water.

Example 4: This example demonstrates how a polyethylene (PE) membrane can be surface modified with a coating having polymerized vinylimidazole monomer with positive charge.

In a representative experiment, a sheet of UPE membrane (1 micron nominal pore size rating) was wet with isopropyl alcohol (IPA) solution for 25 seconds. An exchange solution comprising 100% water was used to rinse the membrane and remove IPA. The membrane sheet was then introduced into the surface modification solution described in Example 1. The membrane was soaked in the solution for 2 minutes. The membrane sheet was removed and placed between 1 mil polyethylene sheets. The excess solution was removed by rolling a rubber roller over the polyethylene/membrane sheet/polyethylene sandwich as it lay flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moved through the UV unit. In this example, the assembly moved through the UV chamber at 10 feet per minute. After emerging from the UV unit, the membrane was removed from the sandwich and immediately placed in DI water, where the membrane was washed by soaking for 5 minutes. Next, the treated membrane sample was washed in methanol for 5 minutes. Following this washing procedure, the membrane was dried on a holder in an oven operating at 50° C. for 10 min.

Example 5: This example illustrates how the dye binding capacity (DBC) of the membrane modified according to Example 4 was determined.

Dye-binding capacity (DBC) is an indirect test of surface charge density of a membrane. A higher DBC means a higher charge density at the surface of the membrane, i.e., a higher concentration of imidazole groups on the membrane surface.

Figure 2:
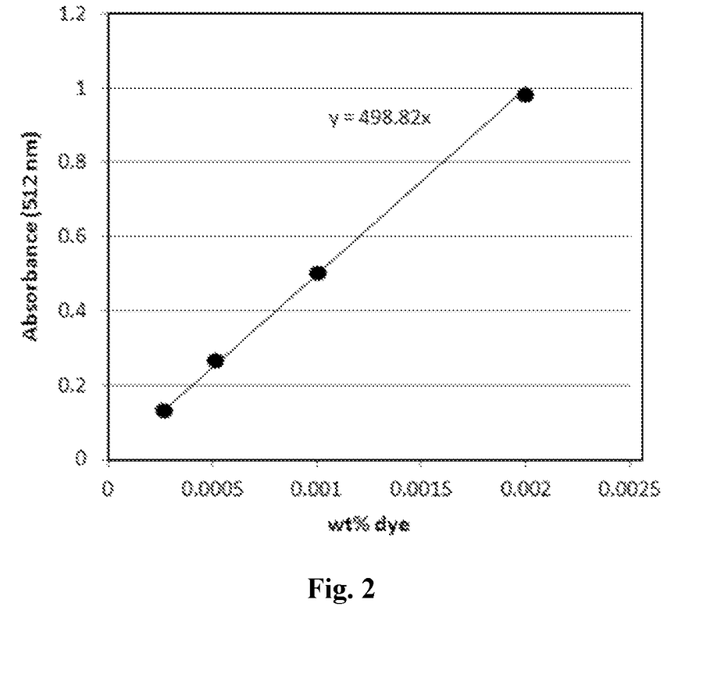
FIG. 2 shows a table of dye solution absorbance relative to weight percent dye, for a method of measuring charge density of a membrane.

A dry 47 mm disk membrane prepared according to Example 4 was placed in a beaker containing 0.002 weight % Ponceau-S dye (Sigma). The beaker was covered, and the membrane was soaked for 5 minutes with continuous mixing at room temperature. The membrane disk was then removed, and the absorbance of the dye solution was measured using a Cary spectrophotometer (Agilent Technologies) operating at 512 nm. The measured result was compared to the absorbance of the starting solution (before membrane soaking). The calibration curve depicted in FIG. 2 was used to convert dye solution absorbance data to weight percent, and finally to mass of dye bound per membrane unit area. The dye binding capacity of the membrane prepared according to this procedure was 42 µg/cm$^2$.

Example 6: This example demonstrates how a PE membrane can be surface modified with a grafted polymerized vinylimidazole monomer with positive charge.

In a representative experiment, a sheet of UPE membrane (0.2 micron nominal pore size rating) was wet with initiator solution prepared according to Example 2 for 25 sec. An exchange solution comprising 100% water was used to rinse the membrane and precipitate the initiator onto the membrane surface. The membrane sheet was then introduced into the surface modification solution (A) described in Example 3. The membrane was soaked in the solution for 2 minutes.

The membrane sheet was removed and placed between 1 mil polyethylene sheets. The excess solution was removed by rolling a rubber roller over the polyethylene/membrane sheet/polyethylene sandwich as it lay flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 10 feet per minute. After emerging from the UV unit, the membrane was removed from the sandwich and immediately placed in DI water, where the membrane was washed by soaking for 5 minutes. Next, the treated membrane sample was washed in methanol for 5 minutes. Following this washing procedure, the membrane was dried on a holder in an oven operating at 50° C. for 10 min.

The dye binding capacity of the membrane prepared according to this procedure was 10 μg/cm$^2$. The determination was carried out as explained in Example 5.

Example 7: This example demonstrates how a PE membrane can be surface modified with a grafted polymerized vinylimidazole and N,N dimethyl acrylamide monomers with positive charge.

In a representative experiment, a sheet of UPE membrane (0.2 micron nominal pore size rating) was wet with initiator solution prepared according to Example 2 for 25 sec. An exchange solution comprising 100% water was used to rinse the membrane and precipitate the initiator on the membrane surface. The membrane sheet was then introduced into the surface modification solution (B) described in Example 3. The membrane was soaked in the solution for 2 minutes. The membrane sheet was removed and placed between 1 mil polyethylene sheets. The excess solution was removed by rolling a rubber roller over the polyethylene/membrane sheet/polyethylene sandwich as it lay flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 10 feet per minute. After emerging from the UV unit, the membrane was removed from the sandwich and immediately placed in DI water where the membrane was washed by soaking for 5 minutes. Next, the treated membrane sample was washed in methanol for 5 minutes. Following this washing procedure, the membrane was dried on a holder in an oven operating at 50° C. for 10 min.

Example 8: This example demonstrates how a polyethylene (PE) membrane can be surface modified with a polymerized crosslinked coating containing both vinylimidazole monomer and N-[2-(dimethylamino)ethyl]acrylamide monomer.

In a representative experiment, a sheet of UPE membrane (1 micron nominal pore size rating) was wet with isopropyl alcohol (IPA) solution for 25 seconds. An exchange solution comprising 100% water was used to rinse the membrane and remove IPA. The membrane sheet was then introduced into a surface modification solution containing 4% N-[2-(dimethylamino)ethyl]acrylamide, 4% vinylimidazole, 2% methylene bisacrylamide, 0.4% Irgacure 2959, 10% methanol, and 79.6% deionized water. The membrane was soaked in the surface modification solution for 2 minutes. The membrane sheet was removed and placed between two polyethylene sheets. The excess solution was removed by rolling a rubber roller over the polyethylene/membrane sheet/polyethylene sandwich as it lay flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 9 feet per minute. After emerging from the UV unit, the membrane was removed from the sandwich and immediately placed in DI water, where the membrane was washed by soaking for 5 minutes. Next, the treated membrane sample was washed in methanol for 5 minutes. Following this washing procedure, the membrane was dried on a holder in an oven operating at 50° C. for 10 min.

Comparative Example 9: This example demonstrates how a polyethylene (PE) membrane is surface modified with a polymerized crosslinked coating containing N-[2-(dimethylamino)ethyl]acrylamide monomer.

In a representative experiment, a sheet of UPE membrane (1 micron nominal pore size rating) was wet with isopropyl alcohol (IPA) solution for 25 seconds. An exchange solution comprising 100% water was used to rinse the membrane and remove IPA. The membrane sheet was then introduced into a surface modification solution containing 8% N-[2-(dimethylamino)ethyl]acrylamide, 2% methylene bisacrylamide, 0.4% Irgacure 2959, 10% methanol, and 79.6% deionized water. The membrane was soaked in the surface modification solution for 2 minutes. The membrane sheet was removed and placed between two polyethylene sheets. The excess solution was removed by rolling a rubber roller over the polyethylene/membrane sheet/polyethylene sandwich as it lay flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 9 feet per minute. After emerging from the UV unit, the membrane was removed from the sandwich and immediately placed in DI water, where the membrane was washed by soaking for 5 minutes. Next, the treated membrane sample was washed in methanol for 5 minutes. Following this washing procedure, the membrane was dried on a holder in an oven operating at 50° C. for 10 min.

Example 10: Three layers of the membrane of Example 4 were stacked together and challenged with 12 mL of a 125 ng/uL plasmid DNA lysate in 50 mM potassium acetate 630 mM NaCl pH 5. The membrane was subsequently washed with 50 mM potassium acetate 630 mM NaCl pH 5 and then eluted with 50 mM Tris pH 9. The binding capacity was 4.6 mg/mL with a yield of 93%.

Example 11: Three layers of the membrane of Example 4 were stacked together and challenged with 12 mL of a 41 ng/uL plasmid DNA solution in 0.875 M potassium acetate pH 5. In one case, the elution was done with 50 mM Tris 1.5

M NaCl pH 9, yielding 353 µg DNA. In a second case, the elution was done with 50 mM Tris 1.5 pH 9, yielding 343 µg. Yields were similar with and without salt in the elution buffer.

Example 12: Two layers of the membrane of Example 8 were stacked together and challenged with 8 mL of 30 ng/uL plasmid DNA lysate with RNase in 50 mM potassium acetate 630 mM NaCl pH 5. The membrane was subsequently washed with 50 mM potassium acetate 630 mM NaCl pH 5 and then eluted with 50 mM Tris 1.5 M NaCl pH 9. The binding capacity was 3.3 mg/mL with a yield of 64%.

Comparative Example 13: Two layers of the membrane of Comparative Example 9 were stacked together and challenged with 8 mL of 30 ng/uL plasmid DNA lysate with RNase in 50 mM potassium acetate 630 mM NaCl pH 5. The membrane was subsequently washed with 50 mM potassium acetate 630 mM NaCl pH 5 and then eluted with 50 mM Tris 1.5 M NaCl pH 9. The binding capacity was 2.3 mg/mL with a yield of 84%.

Although various methods and membranes have been disclosed herein with reference to illustrative embodiments and features, it will be appreciated that the embodiments and features described hereinabove are not intended to limit the scope of the disclosure, and that other variations, modifications and other embodiments will suggest themselves to those of ordinary skill in the art, based on the disclosure herein. The disclosure therefore encompasses all such variations, modifications and alternative embodiments within the spirit and scope of the claims hereafter set forth.

What is claimed is:

1. A method of separating a charged biological molecule from a liquid using a porous ion-exchange membrane sheet, the method comprising contacting liquid that contains the charged biological molecule with a porous ion-exchange membrane comprising a porous polymeric sheet and imidazole ion-exchange groups at surfaces of the porous polymeric sheet, at an adsorption condition that causes the charged biological molecule to adsorb onto the ion-exchange membrane.

2. The method of claim 1, wherein the charged biological molecule is plasmid DNA.

3. The method of claim 1, wherein the adsorption condition includes a pH below 6.

4. The method of claim 1 further comprising eluting the adsorbed biological molecule from the ion-exchange membrane at an eluting condition.

5. The method of claim 4, wherein the eluting condition includes a pH of above 7.

* * * * *